United States Patent

Fruits

[15] 3,688,432
[45] Sept. 5, 1972

[54] ANIMAL TRAP
[72] Inventor: Burl E. Fruits, R.R. #1, Waynetown, Ind. 47990
[22] Filed: March 29, 1971
[21] Appl. No.: 128,872

[52] U.S. Cl. ....................................................43/61
[51] Int. Cl. ............................................A01m 23/18
[58] Field of Search..........................43/61, 67, 121

[56] References Cited

UNITED STATES PATENTS

| | | | |
|---|---|---|---|
| 866,987 | 9/1907 | Turner | 43/61 |
| 2,249,601 | 7/1941 | Chapman | 43/121 |

Primary Examiner—Warner H. Camp
Attorney—Hood, Gust, Irish, Lundy & Coffey

[57] ABSTRACT

An animal trap consisting of a container having a floor provided with a single entry port, an upstanding perimetral wall, a removable cover, preferably resiliently removably held in place on the container, the floor being supported above the ground or other supporting surface at such a level as to provide shelter for a rat or other animal as he seeks to enter the port, a chimney or substantially vertical passageway inside the container and registering with the port, a light, hinged closure for the upper end of the chimney gravity-biased to closed position to which it tends to fall without binding and without a loud clapping noise, latch means for holding the closure in open position and trigger means disposed near the floor and within the container and effective to release the latch means when actuated by an animal within the container. Preferably, the perimetral wall of the chimney is provided with a vertically extended cluster of small perforations through which an animal within the chimney can see and scent bait on the floor of the container and which aids the animal in climbing the vertical wall of the chimney to enter the container past the chimney door; and preferably the device includes a spring finger which overlies the closure and is slightly flexed when the closure is in fully open, latched position, whereby some pressure is applied to the latch to resist accidental disengagement of the latch.

7 Claims, 4 Drawing Figures

PATENTED SEP 5 1972

3,688,432

INVENTOR
BURL E. FRUITS

BY
Hood, Gust, Irish, Lundy & Coffey
ATTORNEYS

ANIMAL TRAP

BACKGROUND OF THE INVENTION

The common brown rat, a natural burrowing rodent, causes millions of dollars of loss to farmers in this country every year. He is a wily creature which is extremely difficult to trap. Although hundreds of types of traps have been devised and, to some extent, used, so far as I am advised there has never been a truly successful rat trap. Therefore, poisons are widely used; but since they are dangerous to domestic animals and even to children, most farmers prefer to avoid them.

The rat spends very little time above ground and then only in desperate search of food and water. He is a gluttonous rodent which will go to great lengths to feed out of sight of his natural enemies, particularly man, dogs and cats.

The rat's fear of being exposed to his natural enemies out in the open is an inherited characteristic. In his feeding habits and in travelling from one location to another, he wants a good cover over and around him. It is my theory that rats are skeptical of everything out in the open as being a trap. Rats are intelligent and cunning and are quick to figure out most traps that may cost them their lives and are cautious of every move they make out in the open.

When rats are out in the open they never venture more than a few feet from their burrows or other cover. They are continually darting under some cover, and from under the cover they take a good look at their surroundings for any danger before moving to another cover. However, in tall grass and weeds that furnish excellent cover, a rat seldom stops until he gets to his destination. When rats are in some good cover such as tall grass and weeds, or under some type of floor, they seem to lose most of their shyness and are far more bold in their eating habits than when exposed in the open. As an illustration, at various times while feeding cattle from a long, stationary trough in my barn, I have noticed a group of rats beneath the trough actually moving along the trough with me as I carried ground feed from one end of the trough to the other, there being approximately 6 inches of space beneath the floor of the trough. I could easily see what the rats were doing. They were bold enough to search out any ground grain that may have sifted through a small crack in the floor and eat the grain in a matter of inches from my feet, so long as they were sheltered by the overlying trough.

I have known rats to gnaw a 2-inch hole through 1¼ inch seasoned white oak lumber in the floor of a cattle feeder to feed from the underneath side, rather than to climb 1 foot over the outside of the trough while exposed to their natural enemies. Apparently, a rat knows this 1 foot is dangerous for him.

On one occasion, during corn harvest, I spilled a few bushels of corn into a pile at the end of a corn elevator out in the open 25 or 30 feet from any building. I left it there for some 3 weeks during which time it did not significantly change in appearance. However, when I started to move the pile I discovered that rats had dug a tunnel in the ground to a point beneath the pile and had been feeding on the corn. Hungry rats will often do the unpredictable and they will also do a lot of hard work to feed out of sight of all predators.

There has been much discussion among people who are experienced in trapping rats and who have found that it is easy to catch the first rat in almost any kind of baited trap but that it is very difficult to catch the second rat in that trap and this is particularly true when a trap is noisy or when a trap is of such character that the first rat is visible to other rats while he is caught in a trap.

It is my present theory that rats are very sensitive to sharp, loud noises, such as the report from any firearm or the noise resulting when two pieces of thin metal are vigorously slapped together or the sharp, loud snap of a trap when sprung and operated by some type of strong spring. Rats are sensitive to another rat or a group of rats in distress. When they see a member of their colony caught and secured by a trap, they are smart enough to avoid the same perdition and stay away from the trap.

The trap of the present invention is so designed that, when it closes to imprison one or more rats, it makes very little noise and the imprisoned rats are not visible from the outside of the trap.

The primary object of the present invention is to provide an animal trap so constructed and arranged as to attract and entrap small animals, and particularly rats or mice, by catering to the instinctive and/or acquired tendencies of the target animals and allaying the fears of such animals so that they will readily enter the trap. More particularly, it is an object of the invention to provide a trap for rats so constructed that the entrance to the trap is located in a position wherein a rat will be sheltered from external view as he approaches the entrance, the entrance will appear to the rat to be clear so that ready escape will apparently be available, the rat will not have to squeeze through any restricted space as he enters the trap, the closure for the entrance will remain open as successive rats pass it in a direction to enter the trap but will almost certainly close promptly if any rat seeks egress in a frightened manner, the closure will fall into place relatively quietly when the latch mechanism is triggered and rats imprisoned in the trap will not be visible from the outside and will not be so injured as to be likely to make noises of distress.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
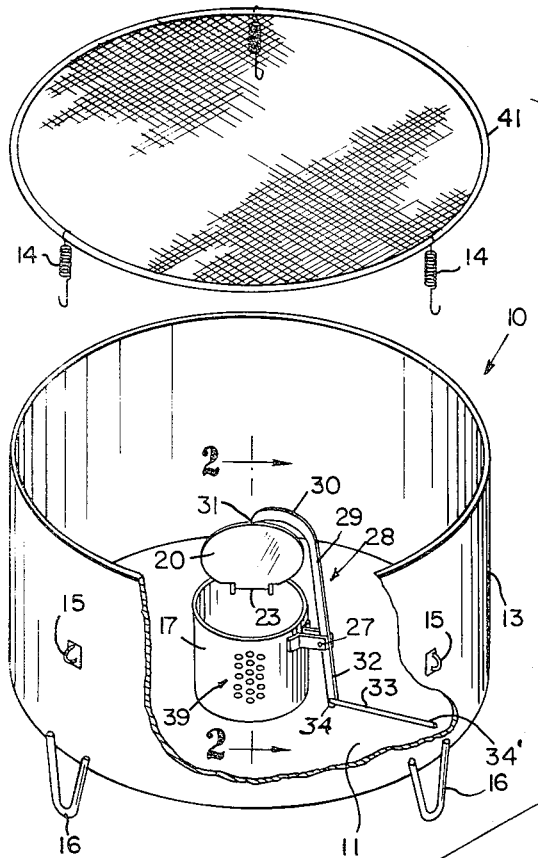
FIG. 1 is an exploded, perspective view of a trap constructed in accordance with the present invention, parts being broken away for clarity of illustration.

Referring more particularly to the drawings, it will be seen that I have illustrated a container indicated generally by the reference numeral 10 and constructed from sheet metal or similar material impervious to the amazing gnawing capacity of rats. The container 10 comprises a floor 11 having a substantially central port 12 therethrough, and an upstanding perimetral wall 13. In the preferred form herein illustrated, the container 10 is generally cylindrical.

A cover 41 generally fitting the contour of the upper end of the container 10 is preferably provided with a plurality of springs 14 removably engageable with hasps 15 suitably secured to the external surface of the wall 13, whereby said cover may be removably, resiliently retained in place on said container. Preferably, but not necessarily, the cover 41 will comprise a circular frame filled with steel mesh so that an attendant can see through the cover to determine whether or not any rats are imprisoned in the trap.

Feet 16 for the container 10 are so proportioned, designed and arranged that the container 10 will be supported upon the ground or other supporting surface with its floor 11 suitably elevated above such surface. The container is so dimensioned that its floor 11 will effectively shelter an adult rat when the rat's nose is in close proximity to the port 12. The degree of elevation of the floor 11 is sufficient to permit a sheltered rat to enter through the port 12. While the bent rod or wire feet 16 illustrated in the drawings are admirably adapted for their function, any other form of foot means may be used so long as it suitably locates the container, tends to support the container in a stable fashion on an uneven surface and provides room between adjacent perimetrally spaced feet for access of rats to the shelter space beneath the container floor 11. Preferably, the foot means will comprise three equally spaced perimetrally arranged feet.

A chimney 17, preferably cylindrical and larger than the port 12 is arranged inside the container 10 upon the floor 11 in registry with the port 12. As shown and preferably, the chimney 17 is cylindrically formed from sheet metal with three inwardly extending, equally peripherally spaced toes 18 integral with the bottom end of the chimney body, said toes being secured to the floor 11 by means of metal screws or bolts 19.

A closure or door 20 for the open upper end of the chimney 17 is proportioned and arranged to fit, with a sloppy clearance, within said upper chimney end. Parallel fingers 21, 21 are suitably fixed to the interior of the chimney wall near its upper end and support a hinge pin 22 passing through a rolled tab 23 integral with the closure 20 to provide a hinged support, generally of the carburetor float type, for said door. An inwardly extending finger 24 within the chimney at a point opposite the hinge pin 22 provides a supporting rest for the door 20 when in closed position. The particular hinge means illustrated effectively inhibits binding of the door 20 in its intended movements. It will be clearly seen that the door 20 is gravity-biased to closed position.

The trap includes latch means for delicately retaining the door 20 in open position. Brackets 25 and 26 are welded or otherwise suitably secured to the external surface of the chimney 17 near the upper end thereof, said brackets extending from said chimney in a non-radial direction to support, near their distal ends, a pivot pin 27 upon an axis whose extension meets an extension of the axis of the hinge pin 22 in a large, acute angle. A lever 28 is journalled, intermediate its ends, upon the pivot pin 27 for oscillation about said angularly related axis of the pin 27. Thus, there is defined a major lever arm 29 extending upwardly from the pin 27 and formed, near its upper end, with a curved portion 30 extending inwardly and then downwardly to its tip 31 which is engageable with the door 20 at a point 40 on the rim of said door which point is substantially most remote from the hinge pin 22. Such engagement, of course, is possible only when the door 20 is in its open position.

The minor arm 32 of the lever 28 extends downwardly from the pin 27 to a point close to the floor 11 and a trigger 33 is operatively engaged with the distal end 34 of said lever arm 32. Preferably, but not necessarily, the trigger 33 is hingedly pinned to the lever arm 32. At any rate, said trigger is so proportioned and designed that its proximal end is supported above the floor 11 by the lever arm 32, while said trigger extends outwardly away from the chimney 17 to a point closely adjacent the perimetral wall 13 of the container with its distal end 34' preferably resting on the floor 11.

A spring finger 35, which may be formed from steel rod, has its base 36 vertically welded to the chimney 17 near the upper end thereof, said finger being bent so that its body extends at an angle upwardly and substantially radially inwardly over the upper end of the chimney. The parts are so proportioned and designed that, as the door 20 is moved toward open position, it will engage the distal end 37 of the spring finger 35 before the door has attained a degree of opening which will permit engagement of the tip 31 of the latch lever arm 29 with the door rim. Thus, as opening movement of the door is continued, the spring finger 35 will be flexed so that, when the latch tip 31 is engaged with the point 40 on the rim of the door 20, the spring finger 35 will exert a gentle pressure thereagainst tending to maintain latch engagement against gentle shocks and/or vibrations.

It may be desirable to notch the latch tip slightly, as at 42, to render the engagement of the latch with the door 20 somewhat more retentive.

Preferably, but not necessarily, a hasp 38 is secured to the upper surface of the door 20 to facilitate manipulation of said door either directly or through the use of a hook of some kind.

A refinement of the invention comprises the vertically arranged cluster of small perforations 39 formed in the chimney 17. These perforations, arranged as they are, not only give a timorous rat who has poked his head through the port 12 into the chimney 17 to look around, an opportunity to see the bait on the floor 11 and perhaps to see one or more other rats moving freely about in the container, but also provide a "ladder" to assist the rat in climbing through the chimney 17 to emerge through its upper end into the inside of the container.

It will be seen that the major lever arm 29 is of such length, shape and location that it does not obstruct egress of rats from the chimney past the open door 20 to the interior of the container 10. Thus, ordinarily, the trap will not be tripped as a rat enters the container and the door will remain open to permit other rats to follow. However, if a rat should seek to jump from the floor of the container into the open mouth of the chimney, he would be very likely to strike either the door or the lever arm 29, thus releasing the latch engagement and permitting the door 20 to close.

Figure 2:
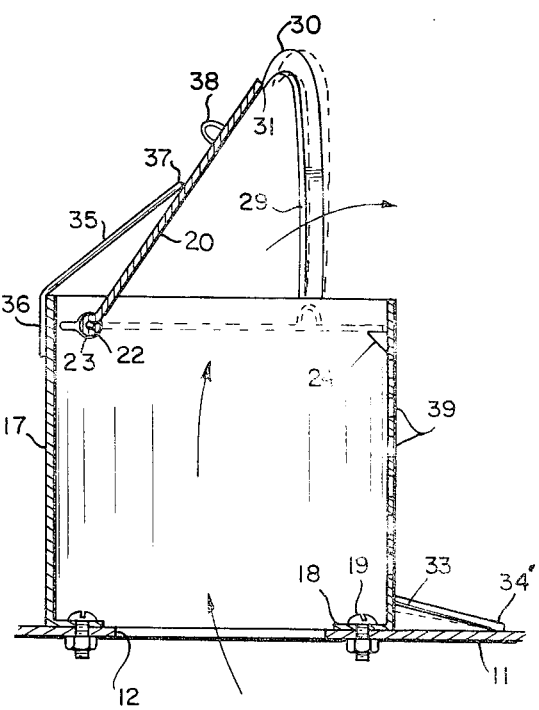
FIG. 2 is an enlarged sectional view taken substantially on the line 2—2 of FIG. 1.
Figure 4:
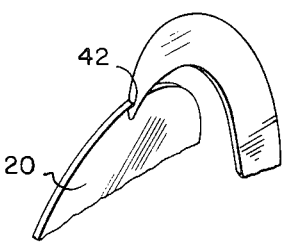
FIG. 4 is an enlarged, fragmentary perspective illustrating a desirable detail.
Figure 3:
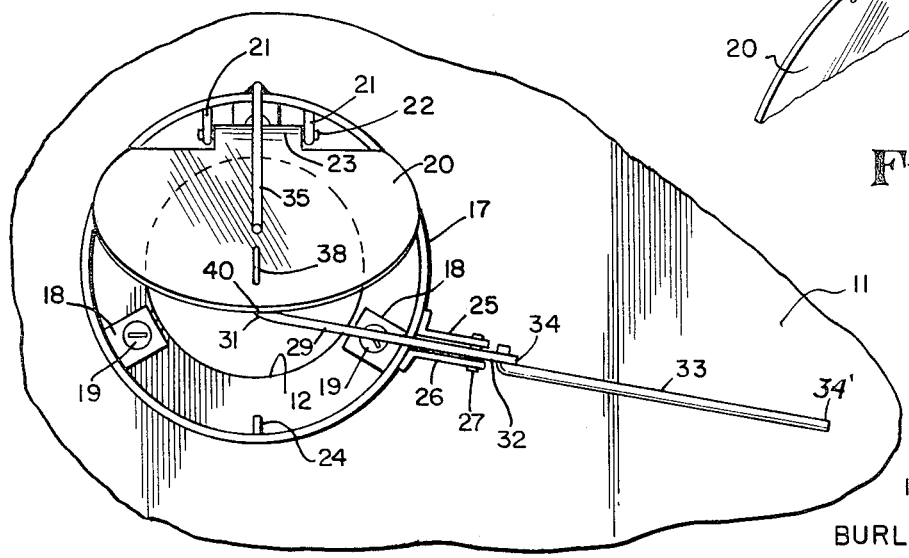
FIG. 3 is a similarly enlarged, fragmental plan view inside the trap, showing the chimney, the closure, the latch and trigger mechanism and the tensioning spring.

Ordinarily, the door 20 will be held open until an animal, moving in random fashion about the floor of the container 10, depresses the trigger 33. Such depression, of course, will swing the lever 28 in a clockwise direction as viewed in FIG. 1 to withdraw the tip 31 from engagement with the door 20. The initial increment of movement of the door 20 in a clockwise direction as viewed in FIG. 2 will remove the door from engagement with the spring finger 35, so that the door 20 falls primarily under the influence of gravity alone into the broken line position of FIG. 2 wherein the point 40 of the door rim rests upon the finger 24. When the door is in that position, of course, there is no possible way in which a rat could open it; and, since there is no other egress from the container 10, whatever number of rats may be in the container at the time when the latch is tripped will be effectively imprisoned.

I presently believe that, in an optimum embodiment of my invention for catching rats, the diameter of the container 10 should be approximately 18 inches and its height, from floor to open top, should be approximately 8 inches, while the legs 16 should be proportioned to locate the floor 11 approximately 2 inches above the supporting surface. The port 12 should be 2 inches in diameter and the chimney 17 should be approximately 3 inches in diameter and 3 inches tall. It will be clear from inspection of FIG. 2 that the open space at the top of the chimney when the door 20 is open is at least as large as the port 12, so that a rat will not need to "squeeze" through any opening into the container. Obviously, the above-mentioned dimensions are merely optimum and not limitative. As obviously, the structure may be scaled down to approximately half size for catching mice, or it can be increased in size for catching other animals.

The structure as herein disclosed is highly effective for its intended purpose. In one of my experiments I used a 55-gallon oil drum for the housing of the trap structure. I cut the entire head out of the drum to form an open end. I cut a 2-inch round hole in the bottom end near the center and bolted the chimney and associated structure to the inside of the drum.

I used a rubber band to hold the door 20 in an open position. I then placed this device in the open driveway of my barn. This was in a new area approximately 150 yards away from the area in which I had made my previously described experiments because I wanted the rats to be more normal and less wise to any kind of traps. I set the drum on three 2-inch wide blocks and baited the inside floor of the drum with ground corn and hog supplement. The purpose of this experiment was to see how long it would take for the rats to find the bait and if they would enter the structure with door in open position.

Approximately 3 hours later, in the evening, I went to the barn to feed my livestock. From a distance, I noticed a rat make a quick move from underneath the floor of my trap to dart across the open driveway. Almost at the same instant, another rat made a quick move from the opposite side of the driveway toward the drum and ran underneath the floor. I watched the rats for several minutes going to and from the drum and then I moved closer to the drum. I noticed each rat, before crossing the driveway in either direction, looked carefully at the open driveway before moving from one cover to the other.

I wanted to see if there were any rats on the inside of the drum; and, walking cautiously up and looking over into the open end of the drum, I saw that the floor was completely hidden by the feeding rats.

The next morning, all the bait had been eaten and there were no rats moving toward or away from the trap. I removed the rubber band from the door, closed the door and rebaited the entire floor with ground hog feed. I checked the trap frequently for three weeks, and not one single rat raised the light door to enter the container to get at the bait.

Thereupon, I removed all of the bait, set the trigger mechanism and rebaited only a small area around the trigger with the deliberate intent of trying to catch one rat. Next morning I had one old female rat.

I destroyed that rat and moved the trap back to the area wherein I had conducted by earlier-described experiments. Obviously, that area was a handicap to the new trap. In one week, I took and destroyed 25 rats from that trap. On three occasions, I caught three rats at a time. The rest of the 25 were caught as doubles or singles. At each setting, the floor was baited on the trigger side only. I was not trying to catch a large number of rats at one time. Instead, I was interested in determining how many times the structure could be successively tripped. It will be apparent from the above facts that my trap does not create any significant trap shyness in the rats.

It will be seen that, because of the particular structure of the trap disclosed herein, it is highly effective to overcome the cunning and intelligence of rats and to attract them again and again to their doom. At the same time, its construction is such that domestic animals are not attracted and there is no way in which it can be dangerous or harmful to children.

What is claimed is:

1. An animal trap comprising a container having a floor and upstanding perimetral wall means, means for supporting said floor at a level spaced above a supporting surface, said floor being formed with a port, an upstanding chimney registering with said port inside said container, a hinged closure for the upper end of said chimney gravity-biased toward closed position, latch means cooperative with said closure to retain said closure in open position, and trigger means having a portion disposed near said floor and effective, when moved, to release said latch means, thereby permitting said closure to fall to closed position.

2. The trap of claim 1 including a removable cover for the open top of said container, and spring means for yieldably retaining said cover in closing relation to said container top.

3. The trap of claim 1 in which the hinge for said closure is disposed adjacent an edge of said chimney and said closure opens upwardly, a spring finger having its proximal end anchored adjacent said edge and extending therefrom upwardly and inwardly to overlie said closure, the distal end of said finger being disposed for engagement by said closure as said closure approaches latched position, whereby said finger is flexed when said closure reaches latched position.

4. The closure of claim 1 wherein said chimney is formed with a cluster of small perforations, said cluster extending from a point near the base of said chimney to a point near the top of said chimney.

5. The trap of claim 1 in which said latch means comprises bracket means supported from said chimney and extending outwardly therefrom, pivot means supported from said bracket means upon an axis perpendicular to a line which is non-radial relative to said chimney, a lever rockably mounted, intermediate its ends, upon said pivot means to define a major lever arm and a minor lever arm, the axis of oscillation of said lever defining an acute angle with the axis of oscillation of said closure, said major lever arm rising above the upper end of said chimney to engage, when said closure is open, a point on the rim of said closure substantially most remote from the axis of oscillation of said closure, the minor lever arm extending downward to a point closely spaced above said container floor, and a trigger connected to the distal end of said minor lever arm and extending outwardly into adjacency with said container perimetral wall.

6. The trap of claim 1 in which said port is large enough to permit free passage therethrough of the type of animal for which the trap is designed, and the clearance space past the closure, when latched in open position, likewise will permit such free passage.

7. A rat trap according to claim 1 in which the recited parts are so proportioned and designed that an adult rat may have ready access to the space between said supporting surface and said floor and, while within said space, shall be fully sheltered, yet able readily to enter, and to pass upwardly through, said chimney.

* * * * *